(12) United States Patent
Kim

(10) Patent No.: US 7,710,446 B2
(45) Date of Patent: May 4, 2010

(54) LIGHT SCANNING UNIT AND IMAGE FORMING APPARATUS USING THE SAME

(75) Inventor: Hyung-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/758,229

(22) Filed: Jun. 5, 2007

(65) Prior Publication Data

US 2008/0106586 A1    May 8, 2008

(30) Foreign Application Priority Data

Nov. 7, 2006 (KR) .................. 10-2006-0109405

(51) Int. Cl.
*B41J 2/47* (2006.01)
*B41J 27/00* (2006.01)
*G02B 26/08* (2006.01)

(52) U.S. Cl. ............... 347/244; 347/258; 347/259; 359/206.1; 359/207.3

(58) Field of Classification Search ............... None
See application file for complete search history.

(56) References Cited

U.S. PATENT DOCUMENTS

| 5,477,372 | A | 12/1995 | Ota | |
|---|---|---|---|---|
| 5,600,476 | A * | 2/1997 | Takada et al. | 359/206 |
| 6,359,717 | B2 * | 3/2002 | Suzuki et al. | 359/205 |
| 6,774,924 | B2 * | 8/2004 | Kato et al. | 347/244 |
| 2006/0001938 | A1 * | 1/2006 | Kim | 359/205 |

FOREIGN PATENT DOCUMENTS

| JP | 8-297256 | 11/1996 |
|---|---|---|
| JP | 2004-184655 | 7/2004 |
| KR | 2004-22353 | 3/2004 |
| KR | 2004-106073 | 12/2004 |

OTHER PUBLICATIONS

Office Action issued by Chinese Patent Office in Chinese Patent Application No. 2007101643323 on Oct. 17, 2008.

* cited by examiner

*Primary Examiner*—Matthew Luu
*Assistant Examiner*—Kendrick X Liu
(74) *Attorney, Agent, or Firm*—Staas & Halsey LLP

(57) ABSTRACT

A light scanning unit includes: a light source generating and irradiating at least one beam corresponding to an image signal; a beam deflector deflecting and scanning the beam irradiated by the light source; and an f-θ lens forming an image from the beam deflected by the beam deflector onto a surface to be scanned, the f-θ lens being provided as one lens and satisfies the following equation (2):

$$-0.2 < \frac{SAG1 + SAG2}{d_2} < 0.2 \qquad (2)$$

where SAG 1 is Z value of an incident surface of the f-θ lens, which faces the beam deflector, SAG 2 is Z value of the exit surface of the f-θ lens, which faces the surface to be scanned, based on an XYZ coordinate system in which a main scanning plane is a Y-Z plane and a sub-scanning plane is an X-Z plane, and $d_2$ is a center thickness of the f-θ lens.

19 Claims, 16 Drawing Sheets

LIGHT SCANNING UNIT AND IMAGE FORMING APPARATUS USING THE SAME

CROSS-REFERENCE TO RELATED APPLICATIONS

This application claims all benefits accruing under 35 U.S.C. §119 from Korean Patent Application No. 2006-109405, filed on Nov. 7, 2006 in the Korean Intellectual Property Office, the disclosure of which is incorporated herein by reference.

BACKGROUND OF THE INVENTION

1. Field of the Invention

Aspects of the present invention relate to a light scanning unit that scans an incident beam to be deflected onto a photosensitive medium and to an image forming apparatus using the same. More particularly, aspects of the present invention relate to a light scanning unit that has a structure for enhancing its sensitivity to curvature of a scanning line at a scanning surface due to a placement error of an f-θ lens and an image forming apparatus using the same.

2. Related Art

Generally, a light scanning unit is employed in image forming apparatuses such as laser beam printers, digital copiers, facsimile machines and multi-functional devices. Such a light scanning unit is used to deflect a laser beam irradiated from a light source and scan the laser beam in a main scanning direction of a photosensitive medium. An electrostatic latent image is formed on the exposed medium through scanning by the light scanning unit (referred to as "main scanning") and by the movement of the exposed medium (referred to as "sub-scanning").

The light scanning unit is also required to decrease the curvature of a scanning line on the scanning surface, which is associated with a placement error of an optical system.

In the light scanning unit, generation of the curvature of the scanning line due to the placement error of the optical system depends on a shape of an optical component and a sub-scanning magnification. The optical component usually has the shape of a lens in the main scanning direction, and its operation is influenced by whether light that has passed through a collimating lens is a parallel light or a converging light and by the number and location of f-θ lenses. In addition, an average and a deviation of the sub-scanning magnification are important factors in determining the magnification by the number and the location of the f-θ lenses and radii of curvature of an incident surface and an exit surface of the f-θ lenses.

Such a conventional light scanning unit is described in Japanese Laid-open Patent Publication No. 2004-184655 "OPTICAL SCANNER AND IMAGE FORMING APPARATUS USING SAME" (Jul. 2, 2004). For example, FIG. 1A and FIG. 1B show a conventional light scanning unit arranged to scan a laser beam in a main scanning direction of an exposed photosensitive medium. Referring to FIG. 1A and FIG. 1B, the conventional light scanning unit comprises a light source 1 that generates and irradiates a beam, a beam deflector 5 that deflects an incident beam to scan the beam irradiated by the light source 1 onto an exposed medium 8, and an f-θ lens 9 that corrects an error contained in the beam deflected by the beam deflector 5. The conventional light scanning unit may also include a diaphragm 2, a collimating lens 3 that collects the beam irradiated by the light source 1, via the diaphragm 2, to be a parallel beam, and a cylindrical lens 4 that shapes the beam. The diaphragm 2, collimating lens 3 and cylindrical lens 4 are installed in an optical path between the light source 1 and the beam deflector 5.

The beam deflector 5 comprises a rotary polygonal mirror rotated by a driving source (not shown). The beam irradiated by the light source 1 changes its direction while it is reflected by the rotating beam deflector 5, thus determining a scanning direction. That is, if the rotary polygonal mirror rotates in a direction A, the incident beam is reflected by a reflecting surface 5a of the rotary polygonal mirror and scanned in a main scanning direction B onto a scanning surface of the exposed medium 8.

The f-θ lens 9 comprises two lenses, a first lens 6 and a second lens 7. The first lens 6 has a meniscus shape in its main scanning sectional view, and thus has a positive refractive power. If "fm" is a focal distance in the main scanning surface of the exposed medium 8 and $d_1$ is a center thickness of the first lens 6, a condition of $d_1/fm<0.06$ is satisfied. The second lens 7 has a surface corresponding to the incident beam that is formed as a non-spherical surface or an oval surface without an inflection point, in a sub-scanning direction. If R is the radius of curvature on a beam axis in the main scanning surface sectional view of the surface corresponding to the incident beam, a condition of $2.5<|R/fm|$ is satisfied.

Therefore, according to the conventional light scanning unit, the curvature of the scanning line can be minimized by lens placement and conditions mentioned above when there is a parallel eccentricity that corresponds to a movement of the f-θ lens 9 in the sub-scanning direction.

On the other hand, since the conventional light scanning unit as described with reference to FIG. 1A and FIG. 1B is configured as an infinite optical system, where the beam that has passed through the collimating lens 3 is scanned parallel and two f-θ lenses 9 are used to improve the sensitivity to curvature of a scanning line, there is a disadvantage in that a degree of freedom of the lens placement is decreased or limited. Accordingly, if a tandem type light scanning unit is symmetrically configured to center around the beam deflector, the degree of freedom of an optical placement is inevitably decreased.

In addition, when two f-θ lenses 9 are used, even if the sensitivity is sufficiently decreased in an optical design, the possibility of occurrence of a placement error is high compared to when a single f-θ lens is used. As a result, the possibility of a lowered performance is increased. Moreover, the manufacturing cost is higher and likewise, the productivity in manufacturing the conventional light scanning unit is lower, compared to a light scanning unit having a single f-θ lens.

SUMMARY OF THE INVENTION

Accordingly, several aspects and example embodiments of the present invention provide a light scanning unit and image forming apparatus, where a sensitivity to curvature of a scanning line at a scanning surface due to a placement error of an f-θ lens is enhanced, a degree of freedom of an optical placement is increased by using a single f-θ lens, productivity is increased by reducing the possibility of the occurrence of a placement error and a manufacturing costs are reduced.

Additional aspects and/or advantages of the invention will be set forth in part in the description which follows and, in part, will be obvious from the description, or may be learned by practice of the invention.

In accordance with an example embodiment of the present invention, a light scanning unit is provided with a light source to generate and irradiate at least one beam corresponding to an image signal; a beam deflector to deflect and scan the beam irradiated by the light source; and an f-θ lens to form an image from the beam deflected by the beam deflector onto a surface to be scanned, the f-θ lens being provided as a single lens having a shape that satisfies the following equation (2):

$$-0.2 < \frac{SAG1 + SAG2}{d_2} < 0.2 \quad (2)$$

where SAG 1 is the Z value of the incident surface of the f-θ lens, SAG 2 is the Z value of the exit surface of the f-θ lens based on an XYZ coordinate system in which a main scanning plane is an Y-Z plane and a sub-scanning plane is an X-Z plane, and $d_2$ is a center thickness of the f-θ lens.

According to an aspect of the present invention, a ratio $R_1/R_2$ of a radius of curvature in a sub-scanning direction of the f-θ lens satisfies the following equation (3):

$$0 < R_1/R_2 < 3.2 \quad (3)$$

where $R_1$ is a radius of curvature of the incident surface and $R_2$ is a radius of curvature of the exit surface.

According to an aspect of the present invention, a sub-scanning magnification Ms_fθ of the f-θ lens satisfies the following equation (4):

$$-2.1 < Ms\_f\theta < 0 \quad (4).$$

According to an aspect of the present invention, the light scanning unit further comprises a collimating lens that collects the beam irradiated by the light source, and a cylindrical lens that corrects the beam irradiated to the beam deflector, wherein the collimating lens and the cylindrical lens are provided in a beam path between the light source and the beam deflector.

According to an aspect of the present invention, an overall magnification deviation ΔMs_tot caused by the collimating lens, the cylindrical lens and the f-θ lens satisfies the following equation (5):

$$-2.0 < \Delta Ms\_tot < 2.0[\%] \quad (5).$$

According to an aspect of the present invention, the collimating lens is positioned so that the beam in the main scanning direction from the collimating lens to the f-θ lens is not a parallel beam.

According to another example embodiment of the present invention, there is provided an image forming apparatus comprising a photosensitive medium where an electrostatic latent image is formed; a light scanning unit to scan a beam onto the photosensitive medium to form the electrostatic latent image; a developing unit to form a toner image on the photosensitive medium; a transfer unit to transfer the toner image formed on the photosensitive medium onto a printable medium; and a fixing unit to fix the image transferred onto the printable medium, wherein the light scanning unit comprises a beam deflector to deflect and scan the beam irradiated by the light source; and an f-θ lens to form an image from the beam deflected by the beam deflector onto a surface to be scanned, the f-θ lens being provided as a single lens having a shape that satisfies the following equation (2):

$$-0.2 < \frac{SAG1 + SAG2}{d_2} < 0.2 \quad (2)$$

where SAG 1 is the Z value of the incident surface of the f-θ lens, SAG 2 is the Z value of the exit surface of the f-θ lens based on an XYZ coordinate system in which a main scanning plane is an Y-Z plane and a sub-scanning plane is an X-Z plane, and $d_2$ is a center thickness of the f-θ lens.

According to an aspect of the present invention, the light scanning unit of the image forming apparatus further comprises a collimating lens to collect the beam irradiated by the light source, and a cylindrical lens to correct the beam irradiated to the beam deflector, wherein the collimating lens and the cylindrical lens are provided in a beam path between the light source and the beam deflector.

According to an aspect of the present invention, an overall magnification deviation ΔMs_tot caused by the collimating lens, the cylindrical lens and the f-θ lens of the light scanning unit of the image forming apparatus satisfies the following equation 5:

$$-2.0 < \Delta Ms\_tot < 2.0[\%] \quad (5).$$

According to an aspect of the present invention, the collimating lens of the light scanning unit of the image forming apparatus is positioned so that the beam in the main scanning direction from the collimating lens to the f-θ lens is not a parallel beam.

According to another example embodiment of the present invention, there is provided a light scanning unit comprising a light source to generate and irradiate one or more beams, each corresponding to an image signal; one or more beam deflectors, each arranged to deflect and scan at least one of the one or more beams irradiated by the light source; and one or more f-θ lenses, each arranged to form an image on a surface of an exposed medium from one of the one or more beams deflected by the one of the one or more beam deflectors; wherein each f-θ lens is a single lens having a shape that satisfies the following equation (2):

$$-0.2 < \frac{SAG1 + SAG2}{d_2} < 0.2 \quad (2)$$

where SAG 1 is the Z value of the incident surface of the f-θ lens, SAG 2 is the Z value of the exit surface of the f-θ lens, based on an XYZ coordinate system in which a main scanning plane is an Y-Z plane and a sub-scanning plane is an X-Z plane, and $d_2$ is a center thickness of the f-θ lens.

According to another example embodiment of the present invention, there is provided an image forming apparatus comprising a plurality of photosensitive media where electrostatic latent images are formed; a multi-beam light scanning unit; a plurality of developing units, each that forming a toner image on one of the plurality the photosensitive medium; a transfer unit that transfers the toner image formed on each of the plurality of photosensitive media onto a printable medium to form an image; and a fixing unit that fixes the image transferred onto the printable medium, wherein the multi-beam light scanning unit comprises a light source to generate and irradiate a plurality of beams, each corresponding to an image signal; one or more beam deflectors, each arranged to deflect and scan at least one of the plurality of beams irradiated by the light source; and a plurality of f-θ lenses, each arranged to form an image on a surface of an exposed medium from one of the plurality of beams deflected by the one of the one or more beam deflectors; wherein each f-θ lens is a single lens having a shape that satisfies the following equation (2):

$$-0.2 < \frac{SAG1 + SAG2}{d_2} < 0.2 \qquad (2)$$

where SAG 1 is the Z value of the incident surface of the f-θ lens, SAG 2 is the Z value of the exit surface of the f-θ lens, based on an XYZ coordinate system in which a main scanning plane is an Y-Z plane and a sub-scanning plane is an X-Z plane, and $d_2$ is a center thickness of the f-θ lens.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

(In FIGS. 2 and 3, based on an XYZ coordinate system, the main scanning plane is the Y-Z plane and the sub-scanning plane is the X-Z plane.)

DETAILED DESCRIPTION OF THE EMBODIMENTS

Figure 1A:
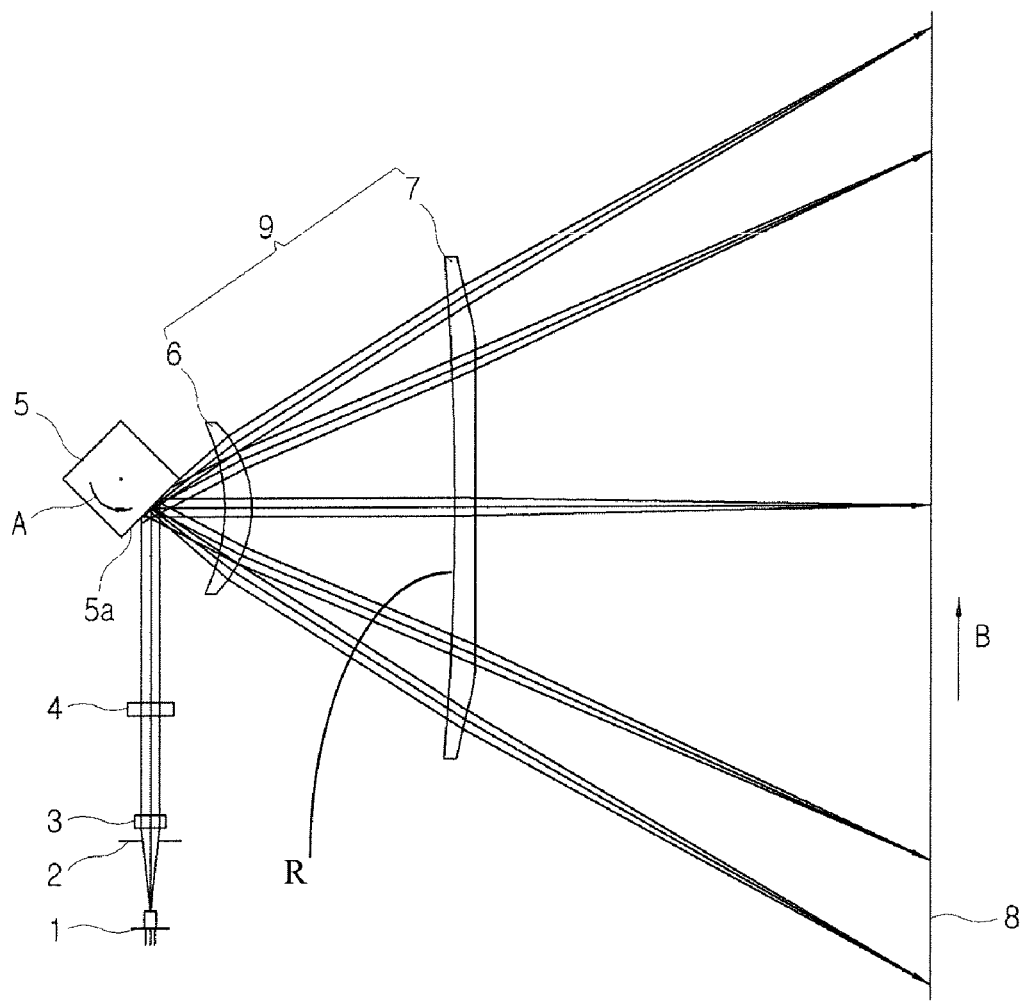
FIG. 1A and FIG. 1B are schematic views showing an optical path of a conventional light scanning unit.
Figure 1B:
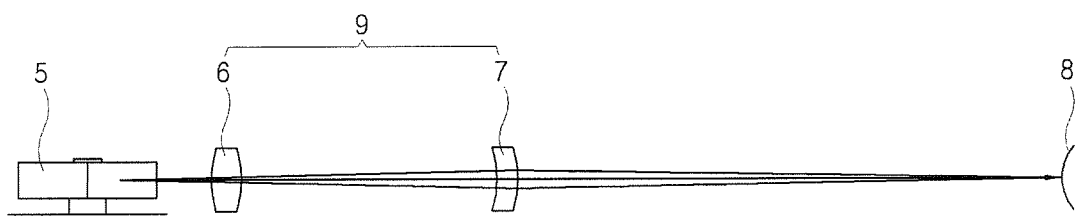

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 2:
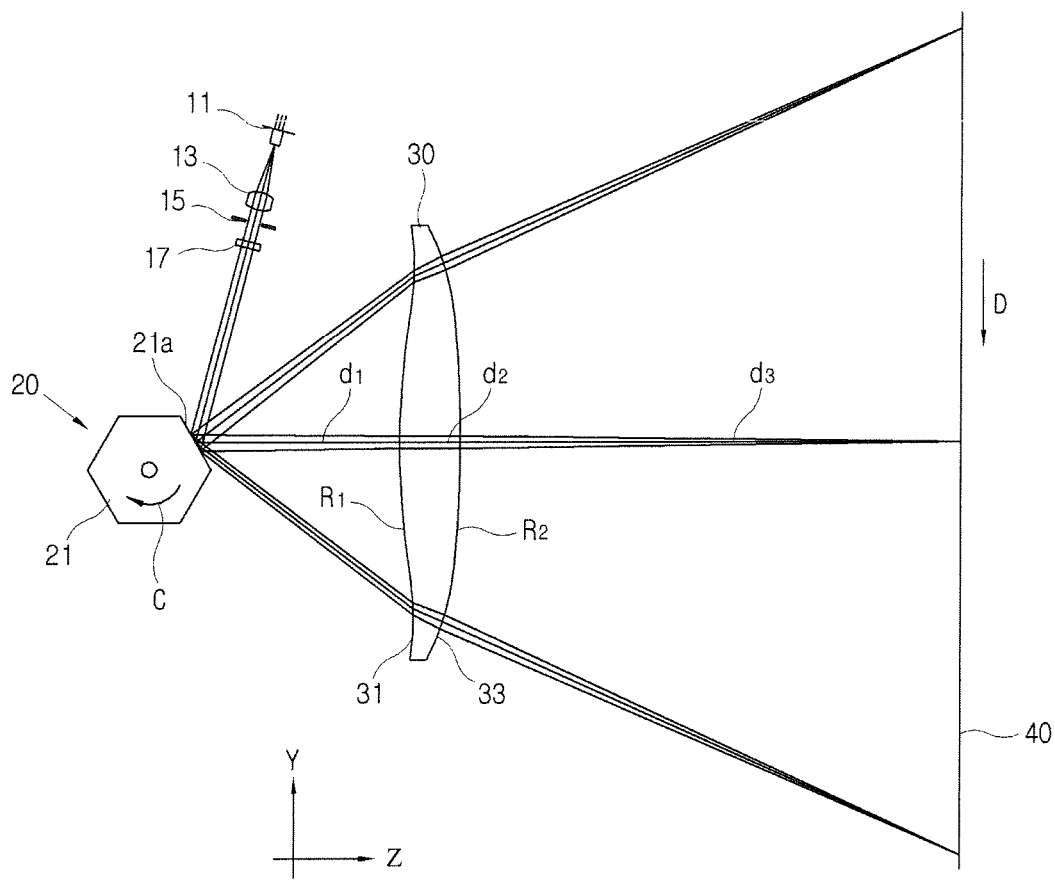
FIG. 2 is a schematic view showing an optical path in a main scanning plane of a light scanning unit according to an embodiment of the present invention.

Referring to FIG. 2, a light scanning unit according to an example embodiment of the present invention is an apparatus that scans a beam in a main scanning direction D onto a scanning surface 40 of an exposed medium, which moves in a sub-scanning direction. The sub-scanning direction may be perpendicular to the main scanning direction D. As shown in FIG. 2, the light scanning unit comprises a light source 11, a beam deflector 20, and an f-θ lens 30.

The light source 11 is controlled in an on/off manner by a driving circuit (not shown) and irradiates at least one beam corresponding to an image signal. The light source 11 may comprise a semiconductor device such as, for example, a semiconductor laser, a light-emitting diode (LED) or other known devices in the art. Also, the light source 11 may irradiate a single beam or a multi-beam. For example, a multi-beam may be irradiated simultaneously if the light source 11 comprises a semiconductor device having a plurality of luminescent points. Such a light source can be used in a tandem image forming apparatus, which forms a color image in a single pass. Since light sources are generally known to those skilled in the art, a detail description of the light source 11 is omitted in this specification.

The beam deflector 20 deflects and scans the beam irradiated by the light source 11, so that the beam can be scanned in a main scanning direction with regard to the scanning surface 40 of the exposed medium. As a non-limiting example, the beam deflector 20 may be a polygonal mirror apparatus as shown in FIG. 2. The polygonal mirror apparatus comprises a driving source (not shown) and a rotary polygonal mirror 21 that is rotated in a predetermined direction, such as, for example, a clockwise direction (direction C) by the driving source. The rotary polygonal mirror 21 has a plurality of reflective surfaces 21a on its sides to deflect and scan an incident beam while the rotary polygonal mirror 21 rotates. For example, the rotary polygonal mirror 21 may have six or more reflective surfaces 21a, considering the scanning speed and the optical path. The rotary polygonal mirror 21 may also have an external diameter of its circumscribed circle equal to or less than 30 mm, and a thickness equal to or more than 2 mm. However, the beam deflector 20 is not limited to the polygonal mirror apparatus as described in FIG. 2 and may be a hologram disc type beam deflector which deflects and scans the incident beam, a galvano-mirror type beam deflector or other known beam deflectors used to deflect a light beam.

A collimating lens 13 and a cylindrical lens 17 may be provided in the optical path between the light source 11 and the beam deflector 20. The collimating lens 13 collects the beam irradiated by the light source 11 to be a converging light. That is, in placing the collimating lens 13, it is preferable but not necessary that the beam have a constitution such as in a finite optical system where an angle of the beam in the main scanning direction from the collimating lens 13 to the f-θ lens 30 is not parallel, but rather is converging.

The cylindrical lens 17 has a predetermined refractive power only in the sub-scanning direction, corrects the beam having passed through the collimating lens 13 and performs imaging of the beam linearly on the beam deflector 20. Furthermore, a diaphragm 15 may be provided between the light source 11 and the cylindrical lens 17 to adjust the diameter of the penetrating beam.

The f-θ lens 30 is provided as a single lens having an incident surface 31 and an exit surface 33. The f-θ lens 30 corrects the beam deflected and scanned by the beam deflector 20 to have different magnifications between the main scanning direction and the sub-scanning direction, so that the scanning line may form an image on the scanning surface 40 of the exposed medium. As a non-limiting example, the f-θ lens 30 may comprise a plastic non-spherical lens and at least one of the incident surface 31 and the exit surface 33 may have a non-spherical surface or a free curve surface where a curvature in the sub-scanning direction changes continuously. As used herein, the term "main scanning direction" refers to a direction D in which the beam is deflected through the beam deflector 20, and the term "sub-scanning direction" refers to a direction in which the exposed medium moves.

The light scanning unit according to aspects of the present invention may further comprise a synchronous detector (not shown) that detects a scanning start position, and a reflective mirror (not shown) provided in an optical path between the beam deflector 20 and the scanning surface 40 of the exposed medium that changes a scanning beam path.

Hereinafter, a condition is described where the curvature of the scanning line at the scanning surface 40 of the exposed medium due to a placement error of the f-θ lens can be minimized by the single f-θ lens 30.

Figure 3:
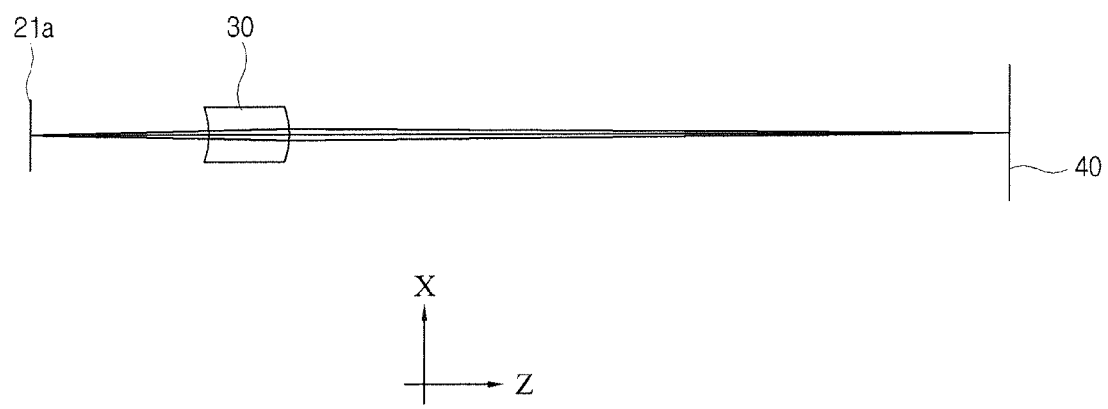
FIG. 3 is a schematic view showing an optical path in a sub-scanning plane of the light scanning unit of the light scanning unit of FIG. 2.

The shape of the f-θ lens 30 has a Z value that satisfies an equation (1), below. The term "Z value" refers to the SAG, which expresses the shape of the f-θ lens 30. Referring to FIGS. 2 and 3, if, based on an XYZ coordinate system, the main scanning plane is a Y-Z plane and the sub-scanning plane is an X-Z plane, the Z value shows changes along the direction of the Z axis according to positions in the directions of the X axis and the Y axis. In equation (1), constants are provided, for example, in TABLE 1 and TABLE 2 described below.

$$Z = \frac{C_y y^2}{1 + \sqrt{1 - C_y^2(k_y + 1)y^2}} + \sum_{m=3}^{10} A_m |y|^m + \frac{C_x \left(1 + \sum_{n=3}^{10} B_n |y|^n\right) x^2}{1 + \sqrt{1 - C_x^2 \left(1 + \sum_{n=3}^{10} B_n |y|^n\right)^2 x^2}} \quad (1)$$

where $C_x$ and $C_y$ are curvatures that are reciprocal to the radius of curvature.

Figure 4:
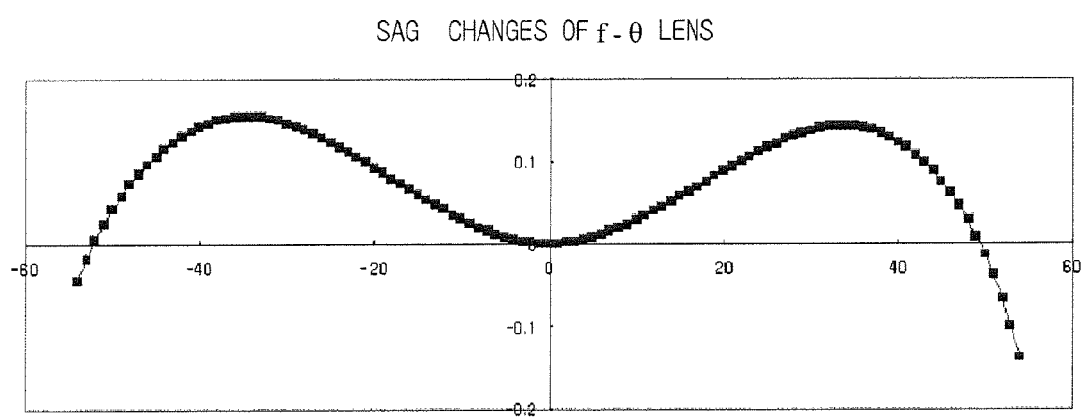
FIG. 4 is a graph showing SAG changes in a main scanning direction with regard to height of the f-θ lens of the light scanning unit of FIGS. 2 and 3.

The f-θ lens 30 has a non-spherical shape in the main scanning direction, and the SAG change in the main scanning direction satisfies equation (2), below. In this case, the SAG change of the f-θ lens 30 may be described graphically as shown in FIG. 4.

$$-0.2 < \frac{SAG1 + SAG2}{d_2} < 0.2 \quad (2)$$

where SAG 1 is the Z value of the incident surface 31 of the f-θ lens 30, SAG 2 is the Z value of the exit surface 33 of the f-θ lens, and $d_2$ is a center thickness of the f-θ lens 30.

Figure 5A:
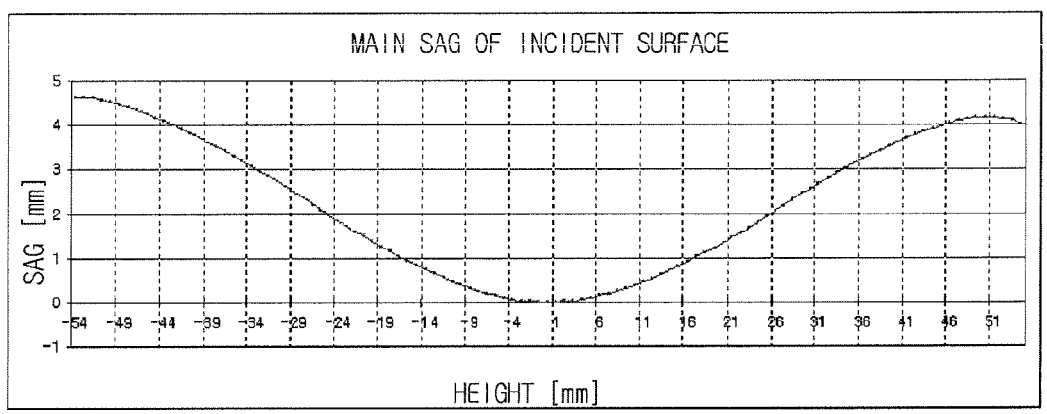
FIGS. 5A to 5C are graphs respectively showing main SAG, sub-scanning radius of curvature and sub-scanning curvature with regard to height of an incident surface of the f-θ lens of the light scanning unit of FIGS. 2 and 3.
Figure 6A:
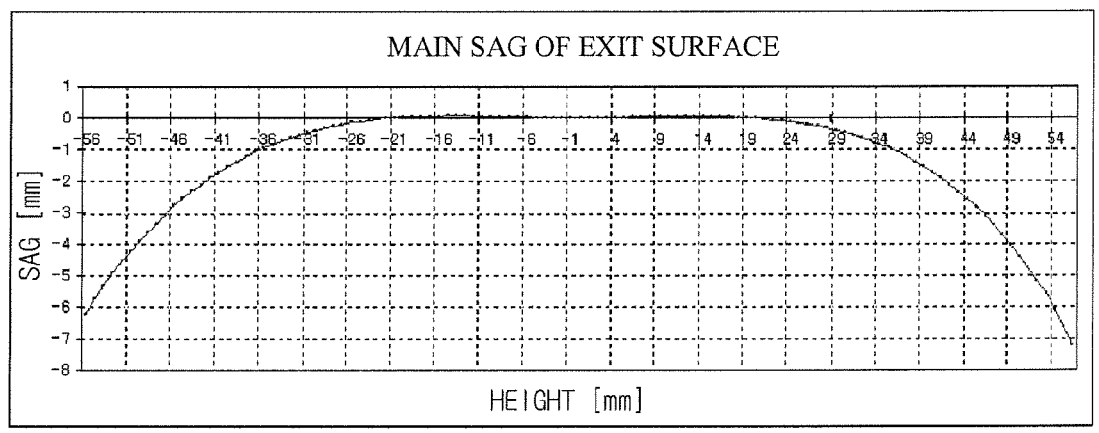
FIGS. 6A to 6C are graphs respectively showing main SAG, sub-scanning radius of curvature and sub-scanning curvature with regard to height of an exit surface of the f-θ lens of the light scanning unit of FIGS. 2 and 3.

To satisfy a condition of equation (2), SAG 1 and SAG 2 have the shapes shown in FIG. 5A and FIG. 6A respectively. Referring to the representation of SAG 1 in FIG. 5A, the Z value is 0 mm at a center of the f-θ lens 30 and increases towards both ends of the main scanning direction. Also, referring to the representation of SAG 2 in FIG. 6A, the Z value shows a maximum value in a negative (−) direction at both ends and moves toward 0 mm at the center of the f-θ lens 30.

A ratio R1/R2 of the radius of curvature in the sub-scanning direction of the f-θ lens 30 may satisfy equation (3):

$$0 < R_1/R_2 < 3.2 \quad (3)$$

where $R_1$ (which equals $1/C_{X1}$) is the radius of curvature of the incident surface 31 of the f-θ lens 30 in the sub-scanning direction and $R_2$ (which equals $1/C_{X2}$) is the radius of curvature of the exit surface 33 of the f-θ lens 30 in the sub-scanning direction.

The lower limit of zero (0) in the equation (3) indicates that the two radii of curvature have the same sign, which indicates that the f-θ lens 30 has a meniscus configuration. If the upper limit in equation (3) is exceeded, the magnification of the f-θ lens 30 is increased, thus having adverse effect on the finite optical system.

Figure 5B:
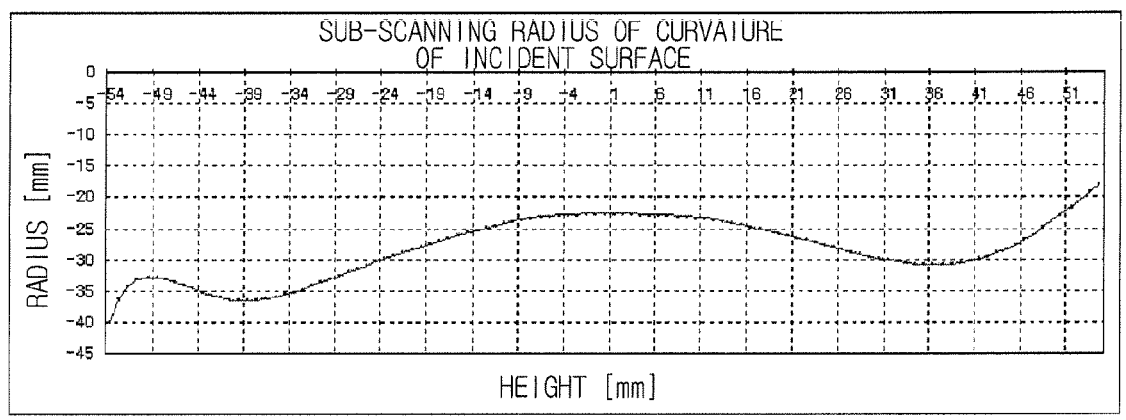
Figure 5C:
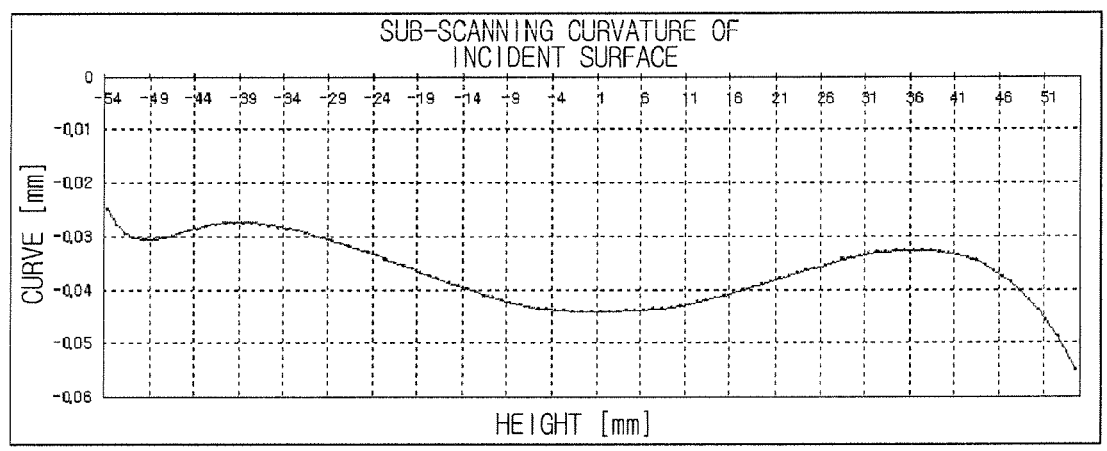
Figure 6B:
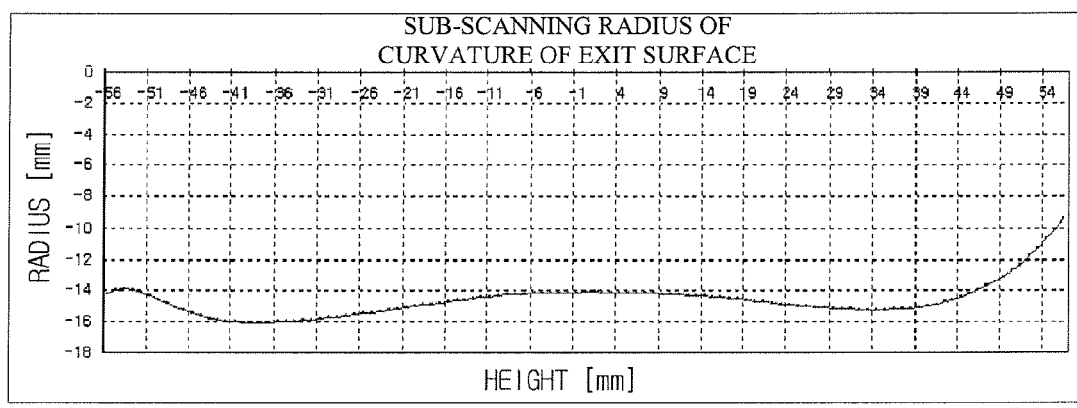
Figure 6C:
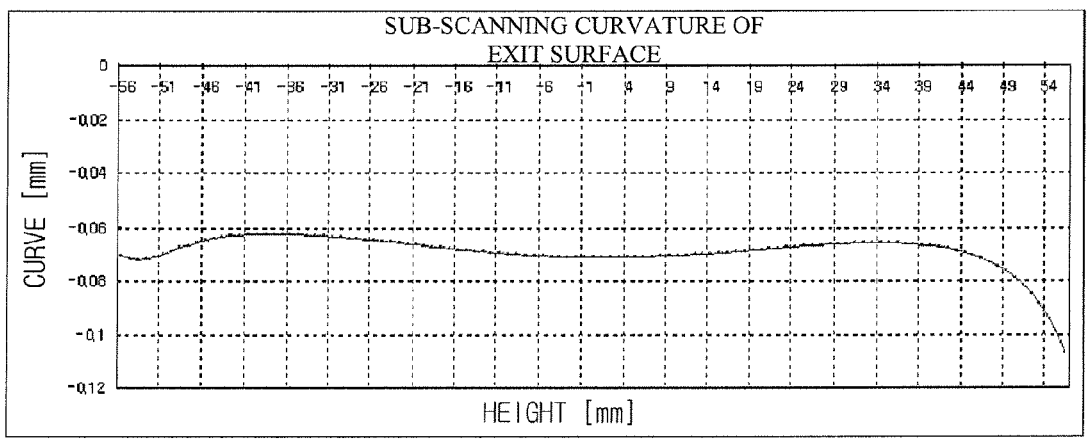

To reduce the sensitivity to the curvature of the scanning line as well as satisfy equation (3), the f-θ lens 30 has a shape in the sub-scanning direction as shown in FIGS. 5B, 5C, 6B and 6C respectively. FIGS. 5B and 5C are graphs respectively showing the sub-scanning radius of curvature and the sub-scanning curvature with regard to the height of the incident surface of the f-θ lens 30. FIGS. 6B to 6C are graphs respectively showing the sub-scanning radius of curvature and the sub-scanning curvature with regard to the height of the exit surface of the f-θ lens 30 of the light scanning unit shown in FIGS. 2 and 3.

As a non-limiting example, the magnification Ms_fθ in the sub-scanning direction and the overall magnification deviation ΔMs_tot may satisfy equations (4) and (5), respectively.

$$-2.1 < Ms\_f\theta < 0 \quad (4)$$

where Ms_fθ having a negative sign means that a horizontal magnification in the sub-scanning direction has a negative (−) value, where an object and its image are reverse each other.

Figure 7:
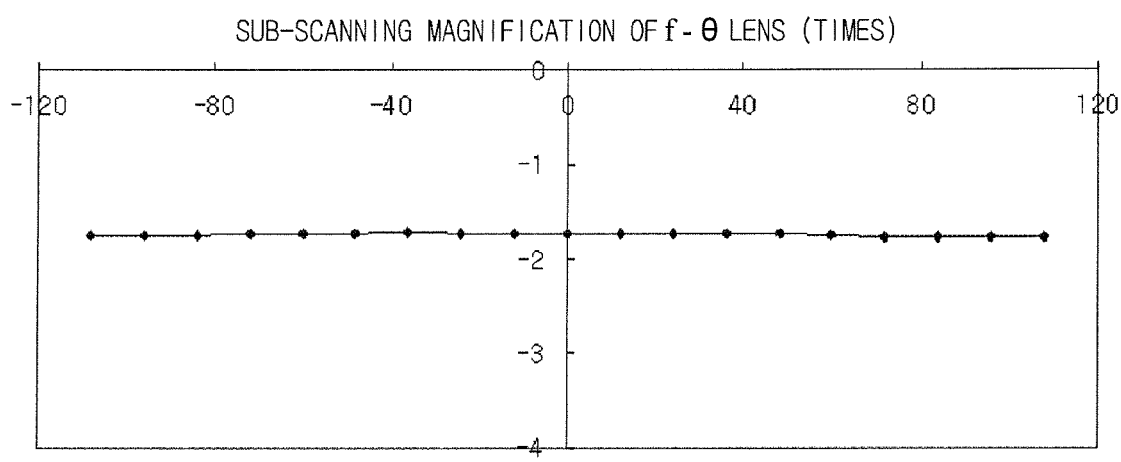
FIG. 7 is a graph showing a sub-scanning magnification of the f-θ lens of the light scanning unit of FIGS. 2 and 3.

Also, if the lower limit of the equation is exceeded, the magnification becomes increased in the constitution of the finite system using the single f-θ lens, thus lowering the lens performance. These relations are graphically shown in FIG. 7.

$$-2.0 < \Delta Ms\_tot < 2.0[\%] \quad (5)$$

where ΔMs_tot means the overall magnification deviation caused by the collimating lens, the cylindrical lens and the f-θ lens.

Figure 8:
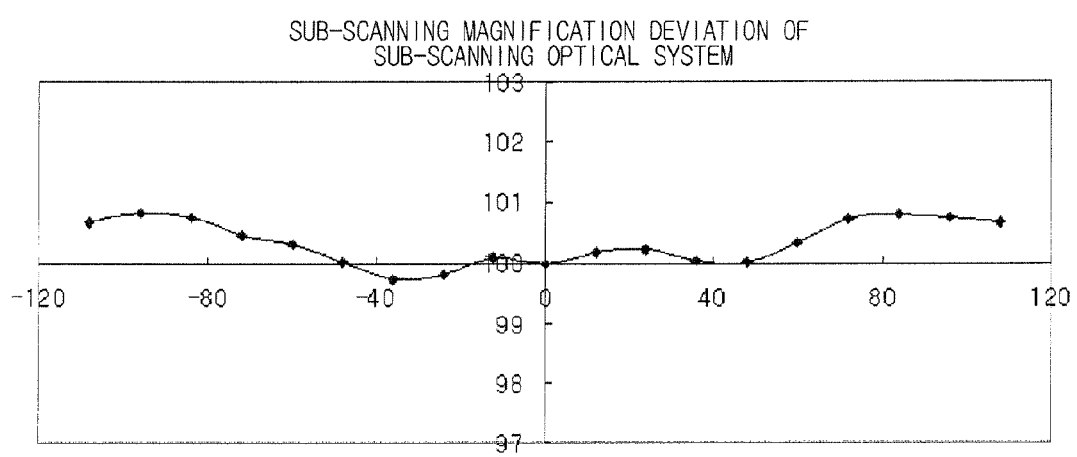
FIG. 8 is a graph showing a deviation of the sub-scanning magnification of the f-θ lens of the light scanning unit of FIGS. 2 and 3.

With the data values according to the embodiment of the present invention as set forth below, the condition of ΔMs_tot<+1[%] is arrived at, thus satisfying the condition of equation 5. Also, this relation is graphically shown in FIG. 8.

Figure 9:
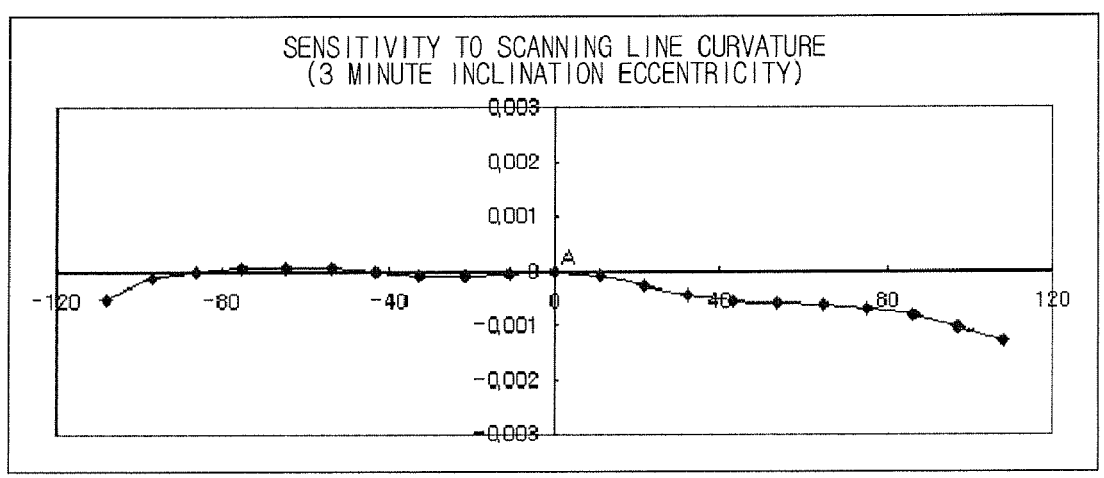
FIG. 9 is a graph showing sensitivity to curvature of a scanning line when there is an inclination eccentricity of the light scanning unit of FIGS. 2 and 3.
Figure 10:
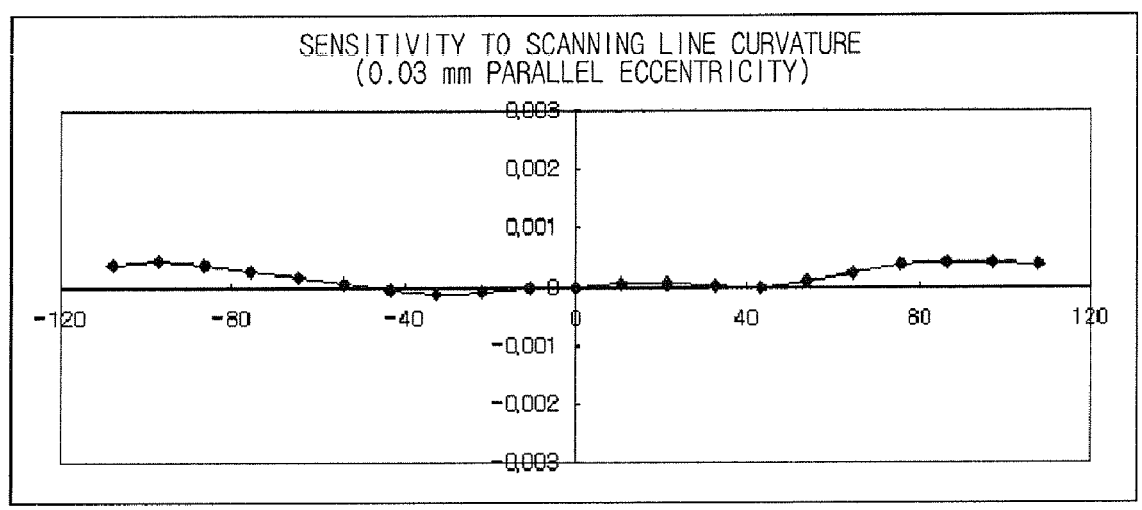
FIG. 10 is a graph showing the sensitivity to curvature of the scanning line when there is a parallel eccentricity of the light scanning unit of FIGS. 2 and 3.

FIGS. 9 and 10 are graphs showing the sensitivity to curvature of the scanning line in the case of an inclination eccentricity and a parallel eccentricity, respectively, of the light scanning unit shown in FIGS. 2 and 3.

Referring to FIGS. 9 and 10, if the f-θ lens 30 has a 3 minute inclination eccentricity, the curvature of the scanning line may be controlled to be equal to or less than about 1.3 μm. Also, if the f-θ lens 30 has a 0.03 mm parallel eccentricity, the curvature of the scanning line may be controlled to be equal to or less than about 0.6 μm. Therefore, it is possible according to aspects of the present invention to realize a performance equal to or better than that of the above conventional technology where two f-θ lenses are used.

Hereinafter, the optical performance of the light scanning unit according to aspects of the present invention is described through specific embodiments satisfying equations (1) to (5).

TABLE 1 and TABLE 2 show the configuration of the light scanning unit and lens data of the f-θ lens, respectively, according to the present embodiment.

TABLE 1

| Wavelength | λ (nm) | 780 |
|---|---|---|
| Incident angle | (°) | 75 |
| Beam deflector | Diameter of outer tangential circumscribed circle (mm) | 30 |
| | Number of Surfaces | 6 |
| Scanning angle | +Y (°) | 37.2 |
| | −Y (°) | −37.2 |
| Beam path | $d_1$ (mm) | 52.5 |
| | $d_2$ (mm) | 15 |
| | $d_3$ (mm) | 131.2 |

TABLE 2

| | f-θ lens (incident surface) | f-θ lens (exit surface) |
|---|---|---|
| $C_y$ | 7.863E−03 | 6.687E−04 |
| $C_x$ | −4.406E−02 | −7.094E−02 |
| $K_y$ | 0.000E+00 | 0.000E+00 |
| A3(+y) | 9.654E−05 | 1.163E−04 |
| A4(+y) | −1.795E−05 | −1.950E−05 |
| A5(+y) | 1.095E−06 | 1.238E−06 |
| A6(+y) | −3.720E−08 | −4.717E−08 |
| A7(+y) | 7.131E−10 | 1.154E−09 |
| A8(+y) | −7.494E−12 | −1.843E−11 |
| A9(+y) | 3.987E−14 | 1.772E−13 |
| A10(+y) | −9.199E−17 | −7.722E−16 |
| A3(−y) | 1.149E−04 | 1.368E−04 |
| A4(−y) | −1.921E−05 | −2.071E−05 |
| A5(−y) | 1.120E−06 | 1.266E−06 |
| A6(−y) | −3.701E−08 | −4.740E−08 |
| A7(−y) | 7.029E−10 | 1.154E−09 |
| A8(−y) | −7.501E−12 | −1.837E−11 |
| A9(−y) | 4.264E−14 | 1.755E−13 |
| A10(−y) | −1.140E−16 | −7.555E−16 |
| B3(+y) | −3.550E−05 | −1.506E−05 |
| B4(+y) | 1.096E−06 | 8.560E−07 |
| B5(+y) | −5.748E−09 | −2.135E−08 |
| B6(+y) | 1.301E−10 | 8.518E−11 |
| B7(+y) | −8.200E−12 | 9.430E−12 |
| B8(+y) | 4.075E−14 | −1.827E−13 |
| B9(+y) | 2.252E−15 | 3.058E−16 |
| B10(+y) | −2.289E−17 | 1.181E−17 |
| B3(−y) | −8.986E−05 | −3.847E−05 |
| B4(−y) | 5.311E−06 | 3.555E−06 |
| B5(−y) | −9.817E−08 | −1.688E−07 |
| B6(−y) | −7.236E−10 | 4.374E−09 |
| B7(−y) | 4.312E−11 | −3.951E−11 |
| B8(−y) | −2.900E−13 | −7.834E−13 |
| B9(−y) | −1.653E−15 | 2.224E−14 |
| B10(−y) | 5.992E−18 | −1.537E−16 |

In the above light scanning unit, since $C_{x1}$=−4.406E−2 and $C_{x2}$=−7.094E−2, $R_1/R_2$=(1/$C_{x1}$)/(1/$C_{x2}$)=−7.094E−2/−4.406E−2≈1.61, thus satisfying equation (3). Also, if Ms_fθ is calculated from data according to the above example, Ms_fθ is −1.73355, thus satisfying equation (4).

However, the f-θ lens 30 according to the present invention is not limited to a lens having the data shown in tables 1 and 2, and the f-θ lens 30 can be varied as long as the conditions of equations 2 to 5 are satisfied.

Figure 11:
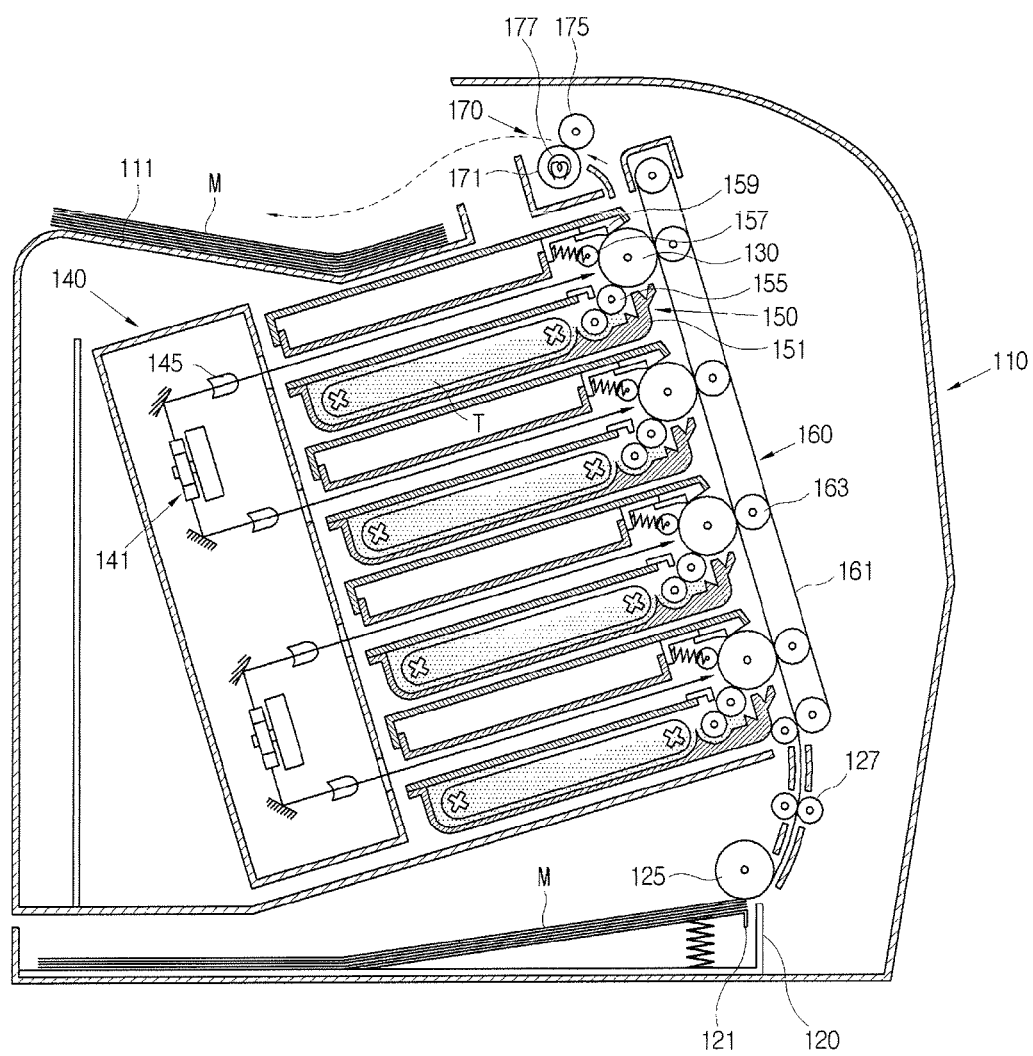
FIG. 11 is a schematic view showing an image forming apparatus according to an embodiment of the present invention.

FIG. 11 is a schematic view of an image forming apparatus according to an embodiment of the present invention. Referring to FIG. 11, the image forming apparatus is a tandem color image forming apparatus, and comprises a cabinet 110 and a photosensitive medium 130, a light scanning unit 140, a developing unit 150, a transfer unit 160, and a fixing unit 170, which are provided in the cabinet 110.

The cabinet 110 forms an external housing of the image forming apparatus, and is provided with a discharging unit 111 at its outer surface to stack a discharged printable medium M. A supplying unit 120 is provided to be removable in the cabinet 110 so that the printable medium M can be loaded and re-supplied. The printable medium M supplied through the supplying unit 120 is conveyed through a conveying path in a direction to the developing unit 150. In more detail, the supplying unit 120 picks up a sheet of the loaded printable medium M by rotation of the feeding roller 125, and supplies the picked up printable medium through a conveying roller 127.

The photosensitive medium 130 is provided in the developing unit 150. The photosensitive medium 130 is sensitized by the beam scanned by the light scanning unit 140 to form an electrostatic latent image on its outer surface.

The developing unit 150 comprises a toner container 151 accommodating a toner T therein; a developing roller 155 facing the photosensitive medium 130 and developing the toner to an area where the electrostatic latent image of the photosensitive medium 130 is formed, a supplying roller 156 supplying the toner T to the developing roller 155, and a charger 157 charging the photosensitive medium 130 to a predetermined electric potential. Also, a cleaning blade 159 may further be provided to remove a waste toner remaining on the photosensitive medium 130.

A separate developing unit 150 and the photosensitive medium 130 may be provided for each color such that a full color image can be formed by single pass. FIG. 11 shows an embodiment comprising four units to transfer yellow (Y), magenta (M), cyan (C) and black (K).

The light scanning unit 140 scans one or more light beams to form electrostatic latent images on each photosensitive medium 130. To this end, the light scanning unit 140 may have a multi-beam light scanning construction such that beams can be scanned simultaneously onto a plurality of the photosensitive media 130. The light scanning unit 140 may comprises light scanning sub-units, each scanning an individual photosensitive medium 130 and each comprising a light source (not shown), a beam deflector 141 that deflects and scans the beam irradiated by the light source, and an f-θ lens 145 to form an image from the beam deflected by the beam deflector on the surface to be scanned, such as, for example, on a photosensitive medium 130 of the developing unit 150. In a color image forming apparatus, the light source may comprise a plurality of luminescent points or may comprise a plurality of semiconductor devices, each of which has single luminescent point, to correspond to each color. Also, the light scanning unit 140 may include two beam deflectors 141 each comprising a rotary polygonal mirror as shown in FIG. 11. In this case, each rotary polygonal mirror deflects and scans two beams irradiated by the light source through different paths. An f-θ lens 145 is provided in each of the four paths through which a beam is deflected and scanned by the beam deflectors 141. In other words, one f-θ lens 145 is provided in each path. Therefore, each beam may be scanned independently respect to the plurality of photosensitive media 130 that are adjacently placed.

Since the specific configuration of each light scanning sub-unit of the light scanning unit 140 is substantially the same as that of the light scanning unit of FIG. 2, a detailed description of each light scanning sub-unit is not repeated.

The transfer unit 160 is located to face the photosensitive medium 130. The transfer unit 160 performs transferring of the toner image formed on the photosensitive medium 130 onto the supplied printable medium M. To this end, the transfer unit 160 comprises a transfer belt 161 and transfer back-up rollers 163 which are placed to face the plurality of photosensitive media 130. The image transferred onto the printable medium by the transfer unit 160 is fixed by the fixing unit 170.

The fixing unit 170 comprises a heating roller 171, a pressing roller 175, and a heat source 177. The surface of the heating roller 171 is heated by heat generated by the heat source 177 and presses the printable medium against the pressing roller 175 to fix the transferred image on the printable medium.

As described above, according to the light scanning unit and the image forming apparatus using the same according to aspects of the present invention, the sensitivity to the curvature of the scanning line due to the placement error of the f-θ lens at the scanning surface may be enhanced by using a single f-θ lens satisfying the conditions of the equations 2 to 5. Also, the degree of freedom of the optical placement may be increased by using one f-θ lens instead of a plurality of lenses, and productivity may be increased and manufacturing costs may be decreased by reducing the possibility of the occurrence of placement error.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the physical arrangement and geometry of components of the light scanning unit including the light source, collimating lens, cylindrical lens, beam deflector may be different from what is shown. The collimating lens and cylindrical lens may be omitted, or more than one collimating lens and cylindrical lens may be provided. Moreover, the physical arrangement and geometry of components of the image forming apparatus, including the photosensitive medium, light scanning unit, developing unit, transfer unit and fixing unit may be different from what is shown. Moreover, the physical arrangement and geometry of components of the multi-beam light scanning unit, including the arrangement and number of light scanning sub-units and beam deflectors may be different from what is shown. Moreover, the physical arrangement and geometry of components of an image forming apparatus containing the multi-beam light scanning unit, including number and arrangement of photosensitive media, light scanning sub-unit, developing units, transfer units and fixing units may be different from what is shown. Accordingly, it is intended, therefore, that the present invention not be limited to the various example embodiments disclosed, but that the present invention includes all embodiments falling within the scope of the appended claims.

What is claimed is:

1. A light scanning unit comprising:
a light source to generate and irradiate at least one beam corresponding to an image signal;
a beam deflector to deflect and scan the beam irradiated by the light source; and
an f-θ lens to form an image from the beam deflected by the beam deflector onto a surface to be scanned,
wherein the f-θ lens is a single lens wherein the entire f-θ lens forming the image from the beam deflected by the beam deflector has a shape that satisfies the following equation (2):

$$-0.2 < \frac{SAG1 + SAG2}{d_2} < 0.2 \qquad (2)$$

where SAG 1 is the Z value of an incident surface of the f-θ lens, SAG 2 is the Z value of an exit surface of the f-θ lens, based on an XYZ coordinate system in which a main scanning plane is a Y-Z plane and a sub-scanning plane is an X-Z plane, and $d_2$ is a center thickness of the f-θ lens.

2. The light scanning unit according to claim 1, wherein the entire f-θ lens forming the image from the beam deflected by the beam deflector has a shape that satisfies the condition that a ratio $R_1/R_2$ of a radius of curvature in a sub-scanning direction of the f-θ lens satisfies the following equation (3):

$$0 < R_1/R_2 < 3.2 \qquad (3)$$

where $R_1$ is a radius of curvature of the incident surface and $R_2$ is a radius of curvature of the exit surface.

3. The light scanning unit according to claim 2, wherein the f-θ lens has a shape that satisfies the condition that a sub-scanning magnification Ms_fθ of the f-θ lens satisfies the following equation (4):

$$-2.1 < Ms\_f\theta < 0 \qquad (4).$$

4. The light scanning unit according to claim 1, further comprising a collimating lens that collects the beam irradiated by the light source, and a cylindrical lens that corrects the beam irradiated to the beam deflector,
wherein the collimating lens and the cylindrical lens are provided in a beam path between the light source and the beam deflector.

5. The light scanning unit according to claim 4, wherein an overall magnification deviation ΔMs_tot caused by the collimating lens, the cylindrical lens and the f-θ lens satisfies the following equation (5):

$$-2.0 < \Delta Ms\_tot < 2.0[\%] \qquad (5).$$

6. The light scanning unit according to claim 4, wherein the collimating lens is positioned so that the beam in a main scanning direction from the collimating lens to the f-θ lens is not a parallel beam.

7. An image forming apparatus comprising:
a photosensitive medium where an electrostatic latent image is formed;
a light scanning unit that scans a beam onto the photosensitive medium to form the electrostatic latent image;
a developing unit to form a toner image on the photosensitive medium;
a transfer unit to transfer the toner image formed on the photosensitive medium onto a printable medium; and
a fixing unit to fix the image transferred onto the printable medium,
wherein the light scanning unit comprises:
a beam deflector to deflect and scan a beam irradiated by a light source; and
an f-θ lens to form an image from the beam deflected by the beam deflector onto a surface to be scanned, wherein the f-θ lens is a single lens wherein the entire f-θ lens forming the image from the beam deflected by the beam deflector has a shape that satisfies the following equation (2):

$$-0.2 < \frac{SAG1 + SAG2}{d_2} < 0.2 \qquad (2)$$

where SAG 1 is the Z value of an incident surface of the f-θ lens, SAG 2 is the Z value of an exit surface of the f-θ lens, based on an XYZ coordinate system in which a main scanning plane is a Y-Z plane and a sub-scanning plane is an X-Z plane, and $d_2$ is a center thickness of the f-θ lens.

8. The image forming apparatus according to claim 7, wherein the entire f-θ lens forming the image from the beam deflected by the beam deflector has a shape that satisfies the condition that a ratio $R_1/R_2$ of a radius of curvature in a sub-scanning direction of the f-θ lens satisfies the following equation (3):

$$0 < R_1/R_2 < 3.2 \qquad (3)$$

where $R_1$ is a radius of curvature of the incident surface and $R_2$ is a radius of curvature of the exit surface.

9. The image forming apparatus according to claim 8, wherein the f-θ lens has a shape that satisfies the condition that a sub-scanning magnification Ms_fθ of the f-θ lens satisfies the following equation (4):

$$-2.1 < Ms\_fθ < 0 \qquad (4).$$

10. The image forming apparatus according to claim 7, wherein the light scanning unit further comprises a collimating lens that collects the beam irradiated by the light source, and a cylindrical lens that corrects the beam irradiated to the beam deflector,
wherein the collimating lens and the cylindrical lens are provided in a beam path between the light source and the beam deflector.

11. The image forming apparatus according to claim 10, wherein an overall magnification deviation ΔMs_tot caused by the collimating lens, the cylindrical lens and the f-θ lens satisfies the following equation (5):

$$-2.0 < ΔMs\_tot < 2.0[\%] \qquad (5).$$

12. The image forming apparatus according to claim 10, wherein the collimating lens is positioned so that the beam in the main scanning direction from the collimating lens to the f-θ lens is not a parallel beam.

13. A light scanning unit comprising:
a light source to generate and irradiate one or more beams, each corresponding to an image signal;
one or more beam deflectors, each arranged to deflect and scan at least one of the one or more beams irradiated by the light source; and
one or more f-θ lenses, each arranged to form an image on a surface of an exposed medium from one of the one or more beams deflected by the one of the one or more beam deflectors;
wherein each f-θ lens is a single lens wherein the entire f-θ lens forming the image from the beam deflected by the beam deflector has a shape that satisfies the following equation (2):

$$-0.2 < \frac{SAG1 + SAG2}{d_2} < 0.2 \qquad (2)$$

where SAG 1 is the Z value of the incident surface of the f-θ lens, SAG 2 is the Z value of the exit surface of the f-θ lens, based on an XYZ coordinate system in which a main scanning plane is a Y-Z plane and a sub-scanning plane is an X-Z plane, and $d_2$ is a center thickness of the f-θ lens.

14. The light scanning unit according to claim 13, wherein for each f-θ lens, the entire f-θ lens forming the image from the beam deflected by the beam deflector has a shape that satisfies the condition that a ratio $R_1/R_2$ of a radius of curvature in a sub-scanning direction of the f-θ lens satisfies the following equation (3):

$$0 < R_1/R_2 < 3.2 \qquad (3)$$

where $R_1$ is a radius of curvature of the incident surface and $R_2$ is a radius of curvature of the exit surface.

15. The light scanning unit according to claim 14, wherein the f-θ lens has a shape that satisfies the condition that a sub-scanning magnification Ms_fθ of the f-θ lens satisfies the following equation (4):

$$-2.1 < Ms\_fθ < 0 \qquad (4).$$

16. The light scanning unit according to claim 13, wherein the multi-beam light scanning unit further comprises, for each one of the plurality of beams irradiated by the light source, a collimating lens that collects the beam irradiated by the light source and a cylindrical lens that corrects the beam irradiated to the beam deflector,
wherein the collimating lens and the cylindrical lens are provided in a beam path between the light source and the beam deflector.

17. The light scanning unit according to claim 16, wherein for each one of the plurality of beams irradiated by the light source, an overall magnification deviation ΔMs_tot caused by the collimating lens, the cylindrical lens and the f-θ lens satisfies the following equation (5):

$$-2.0 < ΔMs\_tot < 2.0[\%] \qquad (5).$$

18. The light scanning unit according to claim 16, wherein for each one of the plurality of beams irradiated by the light source, the collimating lens is positioned so that the beam in the main scanning direction from the collimating lens to the f-θ lens is not a parallel beam.

19. An image forming apparatus comprising:
a plurality of photosensitive media where electrostatic latent images are formed;
a multi-beam light scanning unit;
a plurality of developing units, each that forming a toner image on one of the plurality the photosensitive medium;
a transfer unit that transfers the toner image formed on each of the plurality of photosensitive media onto a printable medium to form an image; and
a fixing unit that fixes the image transferred onto the printable medium, wherein the multi-beam light scanning unit comprises a light source to generate and irradiate a plurality of beams, each corresponding to an image signal;

one or more beam deflectors, each arranged to deflect and scan at least one of the plurality of beams irradiated by the light source; and a plurality of f-θ lenses, each arranged to form an image on a surface of an exposed medium from one of the plurality of beams deflected by the one of the one or more beam deflectors;

wherein each f-θ lens is a single lens wherein the entire f-θ lens forming the image from the beam deflected by the beam deflector has a shape that satisfies the following equation (2):

$$-0.2 < \frac{SAG1 + SAG2}{d_2} < 0.2 \qquad (2)$$

where SAG 1 is the Z value of the incident surface of the f-θ lens, SAG 2 is the Z value of the exit surface of the f-θ lens, based on an XYZ coordinate system in which a main scanning plane is a Y-Z plane and a sub-scanning plane is an X-Z plane, and $d_2$ is a center thickness of the f-θ lens.

* * * * *

UNITED STATES PATENT AND TRADEMARK OFFICE
CERTIFICATE OF CORRECTION

| | | |
|---|---|---|
| PATENT NO. | : 7,710,446 B2 | Page 1 of 1 |
| APPLICATION NO. | : 11/758229 | |
| DATED | : May 4, 2010 | |
| INVENTOR(S) | : Hyung-soo Kim | |

It is certified that error appears in the above-identified patent and that said Letters Patent is hereby corrected as shown below:

Column 14, Line 25, change "claim 14" to --claim 13--, and after "wherein" insert --for each f-$\theta$ lens,--.

Column 14, Line 60, change "plurality" to --plurality of--.

Signed and Sealed this

Ninth Day of November, 2010

David J. Kappos
*Director of the United States Patent and Trademark Office*